United States Patent [19]

Brenner

[11] 4,187,206
[45] Feb. 5, 1980

[54] BLEND COMPOSITION OF AN OIL AND A NEUTRALIZED SULFONATED ELASTOMERIC POLYMER

[75] Inventor: Douglas Brenner, Livingston, N.J.

[73] Assignee: Exxon Research & Engineering Co., Florham Park, N.J.

[21] Appl. No.: 855,774

[22] Filed: Nov. 29, 1977

[51] Int. Cl.$^2$ .............................................. C08L 91/00
[52] U.S. Cl. .......................... 260/23.5 A; 260/23.7 B; 260/33.6 AQ; 260/33.6 PQ; 260/42.33; 260/42.47; 260/DIG. 31
[58] Field of Search ............... 260/33.6 AQ, 33.6 PQ, 260/42.33, 42.47, 79.3 R, 23.5 A, 23.7 B

[56] References Cited

U.S. PATENT DOCUMENTS

| 3,642,728 | 2/1972 | Canter | 260/79.3 R |
| 3,779,974 | 12/1973 | Hubbard et al. | 260/29.7 B |
| 3,887,530 | 6/1975 | O'Farrell et al. | 260/79.3 R |
| 3,974,241 | 8/1976 | Lundberg et al. | 260/897 B |

*Primary Examiner*—Lewis T. Jacobs
*Attorney, Agent, or Firm*—Richard E. Nanfeldt

[57] ABSTRACT

This invention relates to improved blend compositions of a neutralized sulfonated elastomeric polymer and a non-polar backbone process oil which is either paraffinic or naphthenic and has less than 0.75 wt. % of polar type compounds and less than 20 wt. % of aromatic type. These oil extended sulfonated elastomeric products have improved compression set properties as compared to previously existing products.

26 Claims, No Drawings

BLEND COMPOSITION OF AN OIL AND A NEUTRALIZED SULFONATED ELASTOMERIC POLYMER

BACKGROUND OF THE INVENTION

1. Field of the Invention

This invention relates to improved blend compositions of a neutralized sulfonated elastomeric polymer and a non-polar backbone process oil which is either paraffinic or naphthenic and has less than 0.75 wt. % of polar type compounds and less than 20 wt. % of aromatic type. These oil extended sulfonated elastomeric products have improved compression set properties as compared to previously existing products.

2. Description of the Prior Art

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers.

U.S. Pat. No. 3,642,728 teaches a method of selective sulfonation of olefinic unsaturation sites of an elastomeric polymer to form an elastomeric polymer which has a low concentration of sulfonation in the form of sulfonic acid groups. The olefinic sites of the elastomeric polymer are sulfonated by means of a complex of a sulfur trioxide donor and a Lewis base. The $SO_3H$ groups of the sulfonated elastomer can be readily neutralized with a basic material to form an uncured, but ionically crosslinked elastomer which at room temperature has substantially improved physical properties over an uncured unsulfonated elastomer. However, these lightly sulfonated elastomers, unlike their cured unsulfonated counterparts, may be processed like a conventional thermoplastic at elevated temperatures under a shear force in the presence of selected preferential plasticizers which dissipate the ionic associations at the elevated temperatures thereby creating a reprocessable elastomer.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions of this patent are based only on plastic backbones, whereas the compositions of the present invention are based on elastomeric backbones. Additionally, U.S. Pat. No. 3,870,841 fails to recognize the critical selection of a select class of non-polar oils, as does the instant invention, for obtaining superior compression set properties.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

Copending application, Docket C-462 entitled "Improved Process for the Formation of Elastomeric Blends of a Sulfonated Elastomeric Polymer" by Lundberg, Makowski and Bock teaches a solution process for the formation of oil extended, neutralized sulfonated elastomeric polymers, but fails to teach, infer or imply the critical selection of a specific group of non-polar process oils having less than 20 wt. % aromatic constituents and 0.75 wt. % polar type compounds in order to obtain oil extended sulfonated elastomers that have superior compression set properties as is clearly indicated in Table IV of the instant invention.

SUMMARY OF THE INVENTION

It has now been surprisingly found that an improved blend composition of a process oil and a neutralized sulfonated elastomeric polymer having improved compression set properties can be obtained by using a non-polar process oil which is either a paraffinic or naphthenic type oil having less than about 0.75 wt. % polar type compounds and less than 20 wt. % of aromatic constituents.

Accordingly, an object of our present invention is to provide improved blend compositions of a non-polar process oil and a neutralized sulfonated elastomeric polymer, wherein improved compression set properties are realized as compared to previously formed blend compositions; wherein the compositions can be optionally extended with fillers, waxes and polyolefinic thermoplastics.

GENERAL DESCRIPTION OF THE PRESENT INVENTION

This present invention relates to improved blend compositions of a process oil and a neutralized sulfonated elastomeric polymer which have improved compression set properties at use temperatures without any sacrifice in melt flow rates at processing temperatures.

Compression set is one of the most important characteristics of an elastomeric material. It is a measure of a material's ability to hold its shape and to resist flow or permanent distortion while under a distorting force for a prolonged time interval. Compression set measurements also indicate the magnitude of restoring force maintained by a material after being subjected to compression for a prolonged interval of time. It is clear, then, that in applications such as gaskets, weather stripping, and hose, compression set is a crucial property. For example, a substantial clamping force must be maintained between the end of a hose and the fixture to which it is connected in order to avoid leakage; if the rubber hose has poor compression set, the clamping force can decrease over time and result in failure of the seal. Similarly, gaskets and weather stripping must not become severely distorted with use since this would compromise their effectiveness. Even in the application of elastomeric shoe soling compression set is an important property. If the elastomeric sole does not possess satisfactory compression set behavior the sole can spread out with useage, resulting in a change in the shoe size. Because of the importance of compression set characteristics, in many applications the elastomer employed is required to possess compression set values below specified limits. Elastomeric compositions with compression set behavior worse than those limits are barred from the particular application. For instance, most, if not all automotive manufacturers have compression set specifications for the elastomers used in the rubber hoses (such as the radiator and heater hoses). Similarly, there are specifications for the shock absorbing rubber parts and so forth. Because of the crucial importance of satisfactory (low) compression set behavior in a large number of elastomer applications, it is important to optimize the compression set characteristics for elastomers used in those applications. Generally, then, an improvement in the compression set behavior of an elastomer will open up additional markets to that material.

Many chemically cured elastomers such as cured EPDM or cured Butyl rubber can be made to exhibit excellent compression set (e.g. low final set after testing). However, with many thermoplastic elastomer materials, such as the sulfonated elastomers with which this invention is concerned, compromises must be made in compression set performance. The reason for the generally poorer compression set of thermoplastic elastomer materials as compared to cured elastomers is that the effective crosslinkages of thermoplastic elastomer materials must weaken at elevated temperatures in order that the material can be processed as a thermoplastic. Therefore, these effective crosslinkages of the thermoplastic elastomer are generally less permanent than for cured elastomers, and this reduced permanence of the crosslinkages is often manifested to a degree even in the use temperature range for the material. This usually results in some creep in the elastomer—which results in a substantial degree of set when subjected to compression (for example, when compression set test ASTM D 395, Method B is used). The sulfonated elastomers, such as sulfonated EPDM, with which this invention is concerned tend to be defensive in their compression set characteristics. And, in many of the potential applications for sulfonated elastomers it is of importance to minimize the compression set of these materials. However, it is desirable to minimize the compression set without compromising the thermoplastic nature of these sulfonated elastomers, e.g. without diminishing the processability and melt flow of the material at processing temperature. The sulfonated thermoplastic elastomer materials with which this invention is concerned are often utilized in compounded formulations containing for example, oils and mineral fillers, as well as other ingredients. Such additives may serve several functions. For example, since oil and mineral fillers are usually much less costly than the elastomer gums, they reduce the price of the material in the compounded form. They may also help some of the physical properties such as the viscosity at processing temperatures, and the tendency of the material to melt fracture when extruded. In particular, sulfonated EPDM is often utilized in compounds containing oil and mineral filler extenders. These compounds of sulfonated EPDM exhibit a degree of creep and of set under compression which it is often desirable to limit to as small a value as possible. It has now been observed that the nature of the oil used in compounding the sulfonated formulations can have a substantial effect on the compression set values of the compounds. It has been found that oils which have a very low concentration of polar type compounds are superior oils for maintaining the lowest compression set values for the compounds. It has been found that it does not matter whether the oil is primarily paraffinic or naphthenic as long as the polarity and preferably the aromaticity of the oils are sufficiently low. Furthermore, the improvement in compression set behavior which results from employing the very low polarity oils is not accompanied by any decrease in melt flow rate at processing temperatures.

The unsaturated polymers of this present invention include low unsaturated polymers such as Butyl rubber, halobutyl rubber, or EPDM terpolymers. Additionally, other unsaturated polymers contemplated are partially hydrogenated isoprene, partially hydrogenated polybutadiene or an isoprenestyrene random copolymer.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g. 2%.

Illustrative of such a Butyl rubber is Butyl 365 (Exxon Chemical Co.), a mole percent unsaturation of about 2.0% and a Mooney viscosity (ML, 1+8, 212° F.) of about 45.

Low molecular weight Butyl rubbers, i.e., Butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 40 to about 80 wt. % ethylene and about 2 to about 10 wt. % of a diene monomer, the balance of the polymer being propylene. More preferably, the polymer contains about 45 to about 75 wt. % ethylene, e.g. 50 wt. % and about 2.6 to about 9.0 wt. % diene monomer, e.g. 5.0 wt. %. The diene monomer is preferably a nonconjugated diene. The $\overline{M}n$ of the terpolymer is preferably about 10,000 to about 200,000; more preferably about 15,000 to about 100,000; and most preferably about 20,000 to about 60,000. The Mooney viscosity (ML, 1+8, 212° F.) of the terpolymer is preferably 5 to 90, more preferably 10 to 60 and most preferably 15 to 50, e.g. 20. The $\overline{M}v$ of the EPDM is preferably below about 350,000 and more preferably below about 300,000; e.g 270,000. The $\overline{M}w$ of the EPDM is preferably below about 500,000 and more preferably below about 350,000, e.g. 343,000.

Illustrative of these non-conjugated diene monomers which may be used in the EPDM terpolymer are 1,4- hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity at (ML, 1+8, 212° F.) of about 40 and having 50 wt. % of ethylene, 45 wt. % of propylene, and 5.0 wt. % of 5-ethylidene-2-norbornene with an $\overline{M}n$ of about 47,000, an $\overline{M}v$ of about 145,000 and an $\overline{M}w$ of about 174,000. The Vistalon 2504 can be reprocessed through an extruder until a 20 Mooney value has been achieved.

Another EPDM terpolymer, Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Vistalon 3708 (Exxon Chemical Co.) is a terpolymer having a Mooney viscosity (ML, 1+8, 260° F.) of about 45-55 and having about 65 wt. % of ethylene, about 3.3 wt. % of 5-ethylidene-2-norbornene; and about 31.7 wt. % of propylene with an $\overline{M}n$ of about 53,000, an $\overline{M}w$ of about 343,000 and an $\overline{M}v$ of about 27,000.

Vistalon 6505 (Exxon Chemical Co.) is a terpolymer having a Mooney viscosity (ML, 1+8, 260° F.) of about 45-55 and having about 53 wt. % of ethylene, about 9.0 wt. % of 5-ethylidene-2-norbornene and about 38 wt. % of propylene.

Nordel 1320 (DuPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

One means for carrying out the present invention is to sulfonate an olefinically unsaturated polymer with a sulfonating agent selected from the group consisting of a mixture of acetyl sulfate generated in situ from acetic anhydride and concentrated sulfuric acid, acyl sulfate, or a sulfur trioxide donor complexed with a Lewis base containing oxygen, nitrogen or phosphorus.

The term "sulfur trioxide donor" as used in the specification means a compound containing available sulfur dioxide. Illustrative of such sulfur trioxide donors are $SO_3$, chlorosulfonic acid, fluorosulfonic acid, sulfuric acid, oleum, etc. The term "complexing agent" as used in the specification means a Lewis base suitable for use in the practice of this invention, wherein a Lewis base is an electron pair donor.

Typical Lewis bases are: dioxane, tetrahydrofuran, tetrahydrothiophene or triethyl phosphate.

The molar ratio of $SO_3$ donor to complexing agent may be as high as 15 to 1; preferably less than about 9:1, more preferably about 4:1 to about 1:1, e.g. 2:1.

The preferred solvents for preparation of the complexes of sulfur trioxide donor with complexing agents are chlorinated hydrocarbons. Illustrative of such chlorinated solvents are carbon tetrachloride, dichloroethane, chloroform, and methylene chloride. The complexes may also be prepared by direct addition of reagents if precautions are taken to dissipate evolved heat.

The reactions of ethereal complexes of $SO_3$ with the unsaturation of polymer chains has been found to be nonquantitative generally because they are consumed through side reactions with impurities such as water. Therefore, the use of excess complex is desirable to give the required amount of sulfonation.

Other suitable sulfonating agents are the acyl sulfates, which are selected from the group of acetyl, propionyl, butyryl, or benzoyl sulfate, in particular acetyl sulfate.

The acyl sulfate may be produced by reacting concentrated sulfuric acid with an acid anhydride or an acid halide in the presence or the absence of a solvent. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, acetyl sulfate may be preformed by reaction of sulfur trioxide with acetic acid in a non-reactive solvent.

It should be pointed out that neither the sulfonating agent nor the manner of sulfonation is critical, provided that the sulfonating method does not degrade the polymer backbone.

One means for the practice of this invention, is to dissolve the polymer to be sulfonated in a suitable solvent and react it with the sulfonating agent. The solvent medium should be a neutral one for the rubber and the sulfonating agent. The solvent is preferably an aromatic hydrocarbon, an aliphatic hydrocarbon, a cycloaliphatic hydrocarbon or a halogenated aromatic hydrocarbon. Illustrations of these solvents are: isopentane, pentane, cyclohexane, isohexane, hexane, heptane and homologues thereof, benzene, toluene, chlorobenzene or xylene. The preferred solvent is an aliphatic hydrocarbon.

Sulfonating of the polymer is conducted at a temperature between $-10°$ C. and $+100°$ C. Sulfonation occurs when the sulfonating agent is added to the polymer solution. The sulfonating agent is dissolved in a suitable solvent, or may be added directly without solvent. With acetyl sulfate reagent it is most preferred to add acetic anhydride to the polymer cement and then sulfuric acid to prepare the acetyl sulfate reagent in situ. Reaction time may be about 1 to about 60 minutes, more preferably about 5 to about 45 and most preferably about 15 to about 30.

The acid form of the sulfonated elastomer is quenched with water, or a liquid aliphatic alcohol such as methanol, ethanol or isopropanol, an aromatic hydroxyl compound such as aromatic phenol, or a cycloaliphatic alcohol such as cyclohexanol.

The amount of desirable sulfonation depends on the particular application. Preferably, the elastomeric polymer is sulfonated at about 10 to about 60 meq. $SO_3H/100$ g of polymer, more preferably at about 15 to about 50 meq. $SO_3H/100$ g of polymer, and most preferably at about 20 to about 40 meq. $SO_3H/100$ g of polymer. The sulfonic acid content can be determined by either titration of the polymeric sulfonic acid or Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

Polymers containing unsaturation and sulfonic acid groups have been found to be somewhat deficient in thermostability. Therefore, it is desirable to neutralize at least a portion of the sulfonic acid as part of the manufacturing of sulfonated elastomeric polymer. Neutralization further improves the physical properties of the sulfonated polymer.

In preparing the ionomer it is not necessary to neutralize every sulfonic acid group. Preferably, at least 90% of the sulfonic acid groups are neutralized, though 100% of the acids may be neutralized if desired; more preferably about 95 to about 100% of the sulfonic acid groups are neutralized; most preferably about 98 to about 100% are neutralized.

The neutralizing agents of the present invention can be basic salts of carboxylic acids, wherein the cation of the basic salt is selected from the group consisting of I-A, II-A, I-B or II-B, ammonium, aluminum, lead, iron or antimony of the Periodic Table of Elements and mixtures thereof. Suitable monovalent metal ions are Na, K, Li, Cs, Ag, Hg, and Cu. Suitable divalent metal ions are Be, Mg, Ca, Sr, Ba, Cu, Cd, Hg, Sn, Fe, Pb, Co, Ni and Zn.

The carboxylate ion of the metallic salt is derived from the following carboxylic acids as illustrated in the present invention; however, other carboxylic acids of the same generic class can be readily employed and are considered within the spirit and scope of the present embodiment. These carboxylic acids are: acetic, benzoic, lauric, palmitic, myristic, decanoic, octanoic, and stearic.

Neutralization can also be effected with metallic oxides wherein the metallic ion is selected from the group consisting essentially of Groups II-A, II-B or lead and mixtures thereof of the Periodic Table of Elements. Illustrative examples are MgO, CaO, BaO, ZnO, $PbO_2$ or $Pb_3O_4$ and mixtures thereof.

Other neutralizing agents are basic salts of hydroxides or alkoxides, wherein the cation is selected from ammonium or Groups I-A and II-A of the Periodic Table of Elements and mixtures thereof. Useful examples of hydroxides are $NH_4OH$, NaOH, KOH, LiOH, $Mg(OH)_2$ and $Ba(OH)_2$.

A preferential polar plasticizer is used to help weaken the ionic associations of the neutralized sulfonate groups to enable rapid and effective fabrication of the sulfonated polymer. This is necessitated by the fact that for most neutralized sulfonated elastomeric polymers, quite high temperatures are required to obtain appreciable flow rates; and, for some, this temperature is above the thermal decomposition temperature of the polymer. The preferential polar plasticizer through the weakening of the ionic associations decreases the melt viscosity of the neutralized sulfonated elastomeric polymer at elevated temperatures thereby making it readily processable.

By the proper selection of the preferential plasticizer, it is possible to obtain good physical properties for the plasticized neutralized sulfonated elastomeric polymer. A preferred class of preferential plasticizers are metallic salts of fatty acids wherein the fatty acid has about $C_{12}$ to about $C_{40}$ carbon atoms, more preferably about $C_{14}$ to about $C_{26}$, most preferably about $C_{16}$ to about $C_{22}$ carbon atoms and the metallic cation is selected from the group consisting of antimony, lead or Groups IA, IIA, IB or IIB of the Periodic Table of Elements and mixtures thereof. Because with metal salts the cation might partially exchange with the cation of the neutralized sulfonated polymer, it is preferable (but not necessary) that the metal salt contain the same cation as the sulfonated polymer. A preferred plasticizer is zinc stearate, preferably in combination with a zinc neutralized sulfonated polymer. A less preferred class of preferential plasticizers are the aforementioned fatty acids alone or in combination with the aforementioned metallic salts of the fatty acids. Other preferential plasticizers which are useful in the instant compositions include amides, ureas, amines or thioureas and mixtures thereof. The preferential plasticizers are incorporated into the compositions at about 0 to about 60 parts by weight per hundred parts of the metal neutralized sulfonated elastomeric polymer, more preferably at about 2 to about 40, and most preferably about 8 to about 30.

The oils employed in the present invention to provide elastomeric blend compositions having improved compression set properties are non-polar backbone process oils having less than about 0.75 wt. % polar type compounds, more preferably less than about 0.5 wt. % and most preferably less than about 0.4 wt. % as measured by molecular type clay gel analysis, and less than about 20 wt. % aromatic constituents, more preferably less than about 15 wt.% and most preferably less than about 10 wt. %. These oils are selected from paraffinics ASTM Type 104B as defined in ASTM D-2226-70 or naphthenics ASTM Type 104A wherein the oil has a flash point by the Cleveland open cup of at least 350° F., a pour point of less than 40° F., a viscosity of about 70 to about 3000 ssu's and a number average molecular weight of about 300 to about 1000, more preferably 300 to 750. Table I illustrates some oils encompassed by the scope of this invention, having less than about 0.75 wt. % polar type compounds, less than about 20 wt. % aromatic constituents, and having an $\overline{M}n$ of at least about 300.

The process oil is preferably incorporated into the elastomeric product at less than about 200 parts per hundred based on the neutralized sulfonated elastomeric polymer, more preferably at about 10 to about 150 and most preferably at about 25 to about 125. The relative importance of using the very low polarity oils of this invention will be dependent on the total concentration of oil employed. For example, at less than 10 parts per hundred (phr) of the oil (based on 100 parts of the sulfonated polymer) the overall effect of the oil on the compression set will be significantly less (for an oil of a specified polar content) than if the concentration were, say, 25 phr or more. Therefore, while the effect of using a relatively non polar oil rather than a polar oil may be significant at less than 10 phr of oil, the improvement in compression set will be much more substantial at 25 phr of oil or more.

Preferably fillers are included in these compositions containing oil, especially when the higher concentrations of oil are employed. This is so as to avoid excessive softness or weakness of the compounds.

TABLE I

| Oil | Clay-Gel Analysis | | |
|---|---|---|---|
| | Wt. % Saturates | Wt. % Polar Compounds | Wt. % Aromatics |
| ECA 6492 | — | 0 | 0 |
| Tufflo 6026 | 100 | 0 | 0 |
| Tufflo 6014 | 99.9 | 0 | 0.1 |

Additionally, other various additives commonly used in elastomer technology may be incorporated into the compositions for modifications of various properties, wherein the additives are selected from the group consisting of lubricants, a metallic hydroxide, fillers, such as carbon black or mineral fillers, pigments or stabilizers. If the additive is a liquid, it may be added to the cement of the neutralized sulfonated elastomeric polymer prior to isolation by steam stripping. If the additive is a solid, it may be added to a crumb of the sulfonated elastomeric polymer by compounding in an intensive mixing device such as Banbury, a Farrell Continuous Mixer, a compounding extruder, or on a two-roll mill.

For example, a filler may be incorporated into the composition for modification of the hardness of the elastomer as well as altering the surface shine.

Fillers which can be employed in the present invention include carbon black, talcs, ground calcium carbonate, water precipitated calcium carbonate, precipitated hydrated amorphous silica, and delaminated, calcined or hydrated clays and mixtures thereof. These fillers are incorporated into the blend composition at about 0 to about 300 parts per hundred, more preferably at about 10 to about 225, and most preferably at about 20 to about 175.

In order to obtain maximum dispersion for mineral fillers in the elastomer, their preferred size is from about 0.01 to about 10 microns. Some typical fillers are shown in Table II. Some preferred mineral fillers are fine particle size precipitated calcium carbonate and precipitated hydrated amorphous silica because they assist in minimizing compression set without severely decreasing melt flow at processing temperature.

A lubricant may be employed in the blend composition at a concentration level of about 0 to about 50 parts per hundred based on 100 parts of the neutralized sulfonated elastomeric polymers, and more preferably about 5 to about 30. The lubricants of the present instant invention are nonpolar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 1 wt. % polar constituents. These lubricants modify the rheological properties of the composition, improve the processability in forming the elastomeric article. Additionally, amorphous polypropylene can be used as a lubricant.

The acid form of this lightly sulfonated elastomer was neutralized in solution by the addition of excess zinc acetate at a concentration of about 60 meq. per 100 g of polymer. This material was steam stripped and then dried in a fluidized bed hot air drier. This material was utilized for the preparation of some of the samples which are described in the following examples. This zinc neutralized lightly sulfonated EPDM was quite tough even at elevated temperatures, and it was too intractable to be fabricated by rapid polymer processing techniques such as extrusion or injection molding.

EXAMPLE 2

PREPARATION OF A PLASTICIZED, NEUTRALIZED SULFONATED EPDM COMPOUND CONTAINING OIL AND A MINERAL FILLER

A compound of the non-plasticized gum described in Example 1 was formulated with the following ingredients:

| Ingredient | Wt. per 100g of gum (phr) | Wt. used in mix(g) |
|---|---|---|
| Gum | 100 | 24.1 |
| Zinc Stearate | 19 | 4.6 |
| Sunpar 2280, process oil | 60 | 14.5 |
| Purecal U, calcium carbonate | 120 | 29.0 |

The chemical properties which are typically employed to characterize the process oil are described in Table III. Purecal U is a precipitated calcium carbonate made by the BASF Wyandotte Company. The ingredients were blended in a Brabender Plasticorder having a 60 cc. mixing head with Banbury mixing blades as fol-

TABLE II

| Filler | Code # | Oil Absorption grams of oil/ 100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Superx | | 2.6 | 2 | 4.0 |
| Calcined clay. Icecap 1L | 50–55 | | 2.63 | 1 | 5.0–6.0 |
| Talc magnesium silicate | Mistron Vapor | 60–70 | 2.75 | 2 | 9.0–7.5 |
| Precipitated hydrated amorphous silica | Silene D | ~150 | 1.93 | 0.1 | — |

DETAILED DESCRIPTION

The advantages of the improved compositions of the present invention may be more readily appreciated by reference to the following examples.

EXAMPLE 1

PREPARATION OF A NEUTRALIZED LIGHTLY SULFONATED POLYMER

An EPDM was used as the backbone elastomeric polymer. It had a composition of about 52 wt. % ethylene, 43 wt. % propylene and 5 wt. % of 5-ethylidene-2-norbornene, and it had a Mooney viscosity ML @ 100° C. (1+8 min) of about 20. This base polymer was lightly sulfonated using acetyl sulfate in accordance with the method disclosed in U.S. Pat. No. 3,836,511 to a sulfonate level of about 32 meq. per 100 g of base polymer.

lows. Before adding any ingredients to the mixing head, five grams of the Purecal U were preblended with half of the zinc stearate in a beaker at room temperature with a spatula. The other half of the zinc stearate was preblended with the gum in another beaker at room temperature using a spatula. The empty mixing head was set at 115° C. and run initially at 30 RPM. Enough of the (non-preblended) Purecal U was added to the running mixer to fill it (loosely) up to the gate region. All of the oil was then added. About two-thirds of the gum/zinc stearate preblend was next added to the mixer. These ingredients formed a white doughy mass which incorporated the filler which had been loose in the mixer and resulted in a compacted material. The rest of the (non-preblended) filler could then be added, and then the rest of the gum/zinc stearate preblend was added. Finally, the preblend of Purecal U and zinc stearate was added to the mixer. At this point with all of the ingredients added, the mix was still white and doughy, and not a fused melt. The mix was purposely kept at a temperature well below the melting point of the preferential plasticizer up to this point. The reason for this was to avoid melting of the zinc stearate and plasticizing of the gum, since the plasticized gum would form a fused melt much more readily than the unplasticized gum. With the gum not yet fused into a coherent melt the additives which are liquid at the temperature of addition are much more quickly incorporated into the mix, whereas, when an appreciable quantity of a liquid is added to a fused melt, the liquid is taken up by the melt slowly thereby prolonging the time required for the mix. In some cases the addition of liquids or additives which melt even causes loss of torque in the mix because the unincorporated liquid lubricates the melt and allows it to slide around in the mixer rather than being mixed and sheared. An additional advantage of utilizing this procedure of initially mixing the ingredients at a temperature well below the melting point of the polar plasticizer is that the oil need not be premixed with the filler, as is commonly done to speed up the incorporation of the oil into the polymer. In this procedure of initially mixing well below the melting point of the polar plasticizer, the resulting doughy and non-fused state of the mix allows oil and other liquids to be rapidly taken up into the non-fused mixture so that premixing of the oil is not required.

After the doughy mass was mixed for a short time the mixing speed was increased to 75 RPM, and the heat generated by the shearing action increased the temperature to about 130° C. At this temperature the zinc stearate plasticizer was melted, and the material was now a smooth homogeneous fused melt and was mixing very well. The mixing head was then heated by its electric heater to 140° C. at which point the mix was removed from the Brabender head and sheeted by a single pass through a room temperature 2-roll mill. Total mixing time was about 12 minutes. The compound was an off-white color, and it appeared uniform and to have excellent dispersion of the ingredients.

EXAMPLE 3

COMPRESSION SET OF A SULFONATED EPDM COMPOUND CONTAINING PROCESS OILS HAVING VARIOUS POLAR CONCENTRATIONS

The compound described in Example 2, was prepared, and in addition seven similar compounds were also made. These other compounds differed from the compound of Example 2, only in that the process oil was different—instead of the Sunpar 2280 oil, the other oils listed in Table III were substituted at the same weight concentration. Compression set measurements were made on each of these eight samples as follows.

Test disks were made from each of the samples by compression molding a 0.06 inch thick pad at 350° C. One-half inch diameter disks were cut from the pads and plied 4-high to form a test sample which was about 0.24 inches high. These tests were made at room temperature under controlled dry conditions. The test used was the standard ASTM D-395—Method B, which involves 25% compression of the samples for 22 hrs., followed by 30 minutes recovery after the compressive force is removed.

Results for the compounds containing the various oils is given in Table IV. By comparing the results of this table, with the chemical properties of the various oils which are listed in Table III, it is seen that only the oils with concentrations of polar compounds below 0.4 wt. % give the lowest compression set values for these materials of 20% or less. The oils with higher content of polar compounds give significantly higher compression set values of from 24 to 33. For example, even the best of the oils which have a polar content of over 0.4, the Sunpar 180 oil, has a compression set of 24 which is a fractional increase of over 40% above that of the low polar content Tufflo 6026. Such an increase in compression set is likely to limit the applications for the material since compression set is such a crucial property in many applications. Of course, those oils with higher polar contents of above 0.75% have even higher compression set values and will be even more limited in their applications. Various specific applications for articles such as gaskets, and hoses have stringent compression set requirements, such that each increase in compression set for an elastomer will prevent utilization of that elastomer for a certain range of specific applications. Thus, a difference in compression set of 5% can make the difference between utilization or non-utilization of a particular elastomer in a specific application. Therefore, the use of low polar content processing oils will maximize the range of compression-set sensitive applications for which a sulfonated EPDM elastomer can be used.

It is of interest to consider the other chemical properties which are typically given for process oils; these are listed in Table III. Aniline point is generally considered a measure of solvency power, with a low Aniline Point being associated with high solvency. It is conceivable that this high solvency could result in partial solvation of the physical crosslinks of the sulfonated EPDM by the oil, thereby increasing compression set. However, surprisingly, the listed Aniline Point data indicates no correlation between Aniline Point and compression set of the sulfonated EPDM compositions. For example, the lowest Aniline Point oil listed is Sunpar 2280 and the highest is Flexon 340, yet these two oils have very close compression set values. The naphthenic or paraffinic nature of the oil, given in columns 6 and 7 of Table III also seem to have little direct effect on compression set. For example, the compression set of the paraffinic oil Tufflo 6026 is not much different from that of the naphthenic oil Tufflo 6014, whereas the two paraffinic oils Tufflo 6026 and Sunpar 2280 have widely different compression set values. Aromatics content does not appear to have an effect on compression set above about 20 wt. % of aromatic constituents since Flexon 340 and Sunpar 2280 have greatly different aromatic content, and yet they both yield compositions having high compression set values. Those oils which give the better compression set values have the lower aromatic contents of less than 20 wt. %, and the best compression set values were obtained with oils having aromatic contents of less than 10 wt. %. In summary, the wt. percent polar compounds in the oil differentiates between oils which give improved compression set behavior and oils which give less desirable compression set behavior. Therefore, process oils having polar contents no higher than 0.75 wt. %, and preferably no higher than 0.4 wt. %, and aromatic constituents of less than about 20 wt. %, more preferably less than 15 wt. %, are desirable in the many applications of sulfonated EPDM for which compression set is of crucial importance.

TABLE III

CHEMICAL PROPERTIES OF VARIOUS PROCESSING OILS

| Oil Designation | Clay/Silica Gel Analysis (wt. %) | | | Carbon Type Analysis (wt. %) | | | Aniline Point (°F.) |
|---|---|---|---|---|---|---|---|
| | Polar Compound | Aromatics | Saturates | Aromatic Carbon Atoms | Naphthenic Carbon Atoms | Paraffinic Carbon Atoms | |
| Tufflo[1] 6026 | 0 | 0 | 100 | 0 | 31 | 69 | 233 |
| Tufflo[1] 6014 | 0 | 0.1 | 99.9 | 0 | 57 | 43 | 191 |
| Sunpar[2] 2280 | 1.5 | 22.0 | 76.5 | 4 | 25 | 71 | 262 |
| Sunpar[2] 180 | 0.7 | 17.0 | 82.3 | 4 | 26 | 70 | 244 |
| Flexon[3] 790 | 7.3 | 28.2 | 64.5 | 9 | 32 | 59 | 242 |
| Flexon[3] 340 | 1.3 | 70.3 | 28.4 | 31 | 41 | 28 | 95 |
| ECA[4] 6492 | 0 | 0 | — | — | — | — | — |
| Shellflex[5] 371 | 0.3 | 15. | 84. | 1 | 46 | 53 | 214 |

[1] Arco Chemical Co.
[2] Sun Oil Co.
[3] Exxon Chemical Co.
[4] Exxon Chemical Co., this is an olefinic oil having an average carbon chain length of 24.
[5] Shell Chemical Co.

TABLE IV

Compression Set of a Sulfonated EPDM Compound[1] Containing Process Oils Having Various Polar Concentrations

| Process Oil[3] | Compression Set[2] (%) |
|---|---|
| Tufflo 6026 | 17 |
| Tufflo 6014 | 19 |
| Sunpar 2280 | 33 |
| Shellflex 371 | 20 |
| ECA 6492 | 18 |
| Flexon 790 | 29 |
| Flexon 340 | 32 |
| Sunpar 180 | 24 |

[1] The compound is described in Example 2.
[2] Test ASTM D-395, Method B, at room temperature (25° C.), 22 hours under 25% compression, with 30 min. recovery time.
[3] Manufacturers and chemical properties are listed in Table III.

EXAMPLE 4

MELT FLOW AND TENSILE PROPERTIES OF A SULFONATED EPDM COMPOUND CONTAINING PROCESS OILS HAVING DIFFERENT POLAR CONCENTRATIONS

In Example 3, it was demonstrated that the use of low polar content process oils resulted in improved compression set for the compounds. In this example, three of the compounds of Example 3 are compared in their melt flow rates (processibility) at 190° C. and in their room temperature and 70° C. tensile properties. The compounds in this example employ the oils Sunpar 2280, Shellflex 371, and ECA 6492 (see Table III for their specifications and manufacturers). Test pads were made from these samples by compression molding at 350° F. The procedure was to preheat the empty mold plates in the press for a few minutes, then the material was put in the mold and the mold containing the material was preheated in the press with the mold plates slightly open for two minutes. Then the mold plates were pressed closed under a force of about 20 tons for two minutes. The samples were cooled in the molds under pressure for two minutes. Microtensile pads having a thickness of about 0.6 mm and test regions measuring 2.54 mm in width and 12.7 mm in length were cut from the test pads with a die. The samples were stored in closed dry bottles for one or more days prior to tensile testing.

Tensile strengths of the samples were measured with an Instron TM table model instrument, using a pulling speed of 51 mm per minute. Measurements were made at room temperature (25° C.), and also at a higher temperature to determine the usefulness of the materials at elevated temperature. In the measurements at elevated temperature, after being placed in the testing oven, a 3 minute waiting period was allowed before pulling to enable the sample to equilibrate with the oven temperature. The elevated temperature utilized in most measurements was 70° C.

Melt flow rates for the various materials were determined at 190° C. which is in the range of typical processing temperatures for lightly sulfonated EPDM. The melt index instrument specified in ASTM 1238-70 was used, with the standard capillary. The weight of the probe plus the added weight was 12.5 kilograms. Flow rates were measured electronically as probe displacement per minute, and these results were converted to grams per 10 minutes using a conversion factor.

The melt flow rates and tensile properties for the compounds with the different oils are shown in Table V. From Table IV we saw that the compound containing the more polar Sunpar 2280 oil had a compression set which was far greater than for the compounds containing the low polar content oils Shellflex 371 and ECA 6492. An important question is whether this substantial improvement in compression set behavior is associated with detrimental changes in melt flow rate or tensile properties. From Table V we see that there is negligible difference in melt flow rates. Therefore the improvement in compression set is at no cost to high temperature melt processability of the compounds containing the lower polar content oils. Also, at both 25° C. and at 70° C. we see that the softness or stiffnesses as reflected in the initial modulii of the different materials are essentially identical (to within experimental error) for the compounds with the different oils. Only in the elongation of the samples is there a significant difference; and, of course, this difference in elongation is reflected in the maximum tensile strength of the samples. This decrease in elongation for the compounds containing the low polar content oils Shellflex 371 and ECA 6492 is roughly 25%, and results in a decrease in tensile strength of about 10 to 15 percent. Therefore, in applications where high extensions (of well over 200%) are required, compression set may have to be sacrificed for the greater elongation, and a higher polar content oil may be needed. However, in a large range of applications, and probably in the majority of applications, high elongations are not required and compression set is more of a concern. For example, in almost all compressive-mode applications high elongations are not needed—such as for gaskets, and flexible padding. Another major application which does not require high elongations is in flexible tubing. This is an application which requires good compression set in order to maintain secure leak proof seals to the fitting at the end of the hoses. In summary, the utilization of low polar content oils in sulfonated EPDM compounds to obtain lower compression set should be advantageous in most applications as it causes no significant change in melt flow rate (processibility), or softness. Only in those particular uses where high elongation is a requirement might the use of the low polar content oils not be advisable.

TABLE V

MELT FLOW AND TENSILE PROPERTIES OF A SULFONATED EPDM COMPOUND[1] CONTAINING PROCESS OILS HAVING DIFFERENT POLAR CONCENTATIONS

| | | Tensile Properties[3] | | | | | |
|---|---|---|---|---|---|---|---|
| | | 25° C. | | | 70° C. | | |
| Process Oil[5] Employed | Melt Flow Rate[2] (g/10 min) | Strength (psi) | Elong. (%) | Initial Modulus[4] (psi) | Strength (psi) | Elong. (%) | Initial Modulus (psi) |
| Sunpar 2280 | 13.1 | 885 | 315 | 810 | 470 | 425 | 505 |
| Shellflex 371 | 14.3 | 800 | 245 | 820 | 404 | 320 | 510 |
| ECA 6492 | 14.6 | 775 | 250 | 800 | 380 | 270 | 530 |

[1]The compound is described in Example 2.
[2]ASTM 1238-70. Standard Capillary. 190° C. 250 psi.
[3]Microdumbell, about 22 mils thick, 0.1 inch wide, 0.5 inch long straight test region. Pulled at 2 inches/minute.
[4]Modulus determined from initial steepest slope of the stress-strain curve.
[5]Manufacturers and chemical properties are listed in Table II.

EXAMPLE 5

PREPARATION OF A HIGH FLOW SULFONATED EPDM COMPOUND

The EPDM backbone polymer described in Example 1 was sulfonated to about 32 meq. (per 100 g of base polymer) as described in that example and then neutralized with 90 meq. of zinc acetate. 90 meq. of a nonvolatile polar (preferential) plasticizer, stearic acid was also added to the solution prior to steam stripping. This plasticized gum was steam stripped and then dried in a dewatering extruder. A compound (described in co-pending Docket Case C-461) was formulated from this plasticized gum with the following ingredients:

| Ingredient | wt. per 100g of plasticized gum (phr) | wt. used in mix (g) |
|---|---|---|
| Plasticized gum | 100 | 23.7 |
| Sunpar 180 Oil | 85 | 20.1 |
| Purecal U | 40 | 9.5 |
| Protox 166 | 25 | 5.9 |
| Titanox 1000 | 5 | 1.2 |
| Mg(OH)$_2$ | 0.55 | 0.13 |
| F 3504 wax | 15 | 3.6 |

The manufacturer and the chemical properties of the oil are described in Table III. Purecal U is a precipitated calcium carbonate made by the BASF Wyandotte Company. Protox 166 is zinc oxide made by New Jersey Zinc Co., Titanox 1000 is titanium dioxide made by National Lead Industries Inc., and F 3504 is a wax made by Exxon Chemical Company.

The ingredients were blended in a Brabender Plasticorder having a 60 cc. mixing head with Banbury mixing blades. The mix was done "upside down" with the filler and oil being added first at 100° C. and then the gum and other components being added later. A 30 RPM speed was used for the first part of the mix. After everything was added to the mixer, the speed was increased to 50 RPM and the temperature was raised rapidly to 140° C. by electrical heating. A total mixing time of about 12 minutes was used, good mixing was obtained and a homogeneous compound having good dispersion of the ingredients was produced.

EXAMPLE 6

COMPRESSION SET OF A HIGH MELT FLOW SULFONATED EPDM COMPOUND CONTAINING PROCESS OILS HAVING DIFFERENT POLAR CONCENTRATIONS

The high melt flow compound prepared in Example 5 is used in this example, and, in addition, a second high flow compound was prepared which was identical to that of Example 5 except for substituting a very low polarity oil, ECA 6492 (Table III), for the Sunpar 180 oil. These compounds were made with two different sets of plasticized gum which were both prepared as described in Example 5, but gum B was prepared about a year later than gum A. Compression set measurements were made on these two sets of compounds using ASTM D-395—Method B (except that because of material limitations smaller size samples were used—the smaller size appeared to have no significant effect on the test results). The tests were done under ambient room conditions at room temperature and involved 25% compression of the samples for 22 hours, followed by 30 minutes recovery after the compressive force is removed.

Results for these high melt flow compounds containing different oils is given in Table VI. The relative results are similar to those for the other compound used for these oils in Example 3 and Table IV. The very low polar oil ECA 6492 maintains a significant advantage in compression set over that of the more polar Sunpar 180 oil. The same difference is manifested with both the older gum (A) and the new gum (B). The older gum (A) exhibits a change in compression set as compared with the newer gum (B), but identical changes are shown by both of the oils.

This example shows that the advantage in compression set of the very low polarity oil is a general phenomenon for the sulfonated EPDM material, and is not restricted to a particular formulation or particular additives. For instance, the compound of this example is a high melt flow material having roughly 10 times the melt flow of the compound of Example 3, and its total compression set is considerably greater than for the compound in Example 3. The compound of this example also uses a different plasticizer, stearic acid rather than zinc stearate. Furthermore, this high flow compound contains a higher concentration of oil and a much lower concentration of filler, as well as a number of additional additives such as wax and zinc oxide. With all of these changes, an improvement in compression set which is very similar to the improvement for the compound of Example 3, is obtained by changing from the more polar Sunpar 180 oil to the very low polarity ECA 6492 oil.

TABLE VI

Compression Set of a High Melt Flow Sulfonated EPDM Compound[1] Containing Process Oils Having Different Polar Concentrations

| Process Oil[2] | Gum[3] | Compression Set[4] (%) |
|---|---|---|
| Sunpar 180 | A | 44 |
| ECA 6492 | A | 37 |
| Sunpar 180 | B | 46 |
| ECA 6492 | B | 39 |

[1]This high flow compound (with the Sunpar 180 oil) is described in Example 5.
[2]Manufacturers and chemical properties are listed in Table III.
[3]The gums were prepared accordng to the procedures of Example 5. Gum B was from a different lot, manufactured a year later than Gum A.
[4]Test ASTM D-395, Method B, at room temperature (2° C.), 22 hours, under 25% compression, with 30 min. recovery time.

What is claimed is:

1. An elastomeric blend composition which is injection moldable or extrudable comprising:
   (a) a neutralized sulfonated elastomeric polymer having about 15 to about 50 meq. of metal sulfonate groups per 100 grams of said neutralized sulfonated elastomeric polymer, said metal sulfonate containing an ammonium or metal counterion; and
   (b) about 10 to about 200 parts by weight of a non-polar process oil per 100 parts of said neutralized sulfonated elastomeric polymer, said non-polar process oil having less than 0.75 wt.% polar type compounds as measured by molecular type clay gel analysis and less than 10 wt.% aromatic constituents.

2. A composition according to claim 1, wherein said concentration of said process oil is less than about 150 parts by weight per 100 parts of said sulfonated polymer.

3. A composition according to claim 1, wherein said nonpolar process oil has an Mn of about at least 300.

4. A composition according to claim 1, wherein said sulfonated elastomeric polymer is derived from an unsulfonated elastomeric polymer selected from the group consisting of Butyl rubber, and EPDM terpolymers.

5. A composition according to claim 4, wherein said EPDM terpolymer consists essentially of about 45 to about 80 wt. percent of ethylene, from about 10 to about 53 wt. percent of an alpha-olefin, and about 2 to about 10 wt. percent of a diene monomer.

6. A composition according to claim 5, wherein said alpha-olefin is propylene.

7. A composition according to claim 6, wherein said diene is selected from the group consisting of 1,4 hexadiene, dicyclopentadiene, alkylidene substituted norbornenes, methylene norbornene and tetrahydroindene.

8. A composition according to claim 7, wherein said diene is non-conjugated.

9. A composition according to claim 7, wherein said diene is 5-ethylidene-2-norbornene.

10. A composition according to claim 1, wherein said metal counterion is selected from the group consisting of iron, lead, antimony, and Groups IA, IIA, IB and IIB of the Periodic Table of Elements and mixtures thereof.

11. A composition according to claim 1, further including a preferential plasticizer at a concentration level of less than about 60 parts by weight per 100 parts of said neutralized sulfonated elastomeric polymer.

12. A composition according to claim 11, wherein said preferential plasticizer is selected from the group consisting of metallic salts of carboxylic acids, amides, ureas, thioureas and amines and mixtures thereof.

13. A composition according to claim 11, wherein said preferential plasticizer is a metallic salt of stearic acid, the metal ion of said metallic salt being selected from the group consisting of iron, lead, antimony and Groups IA, IIA, IB and IIB of the Periodic Table of Elements and mixtures thereof.

14. A composition according to claim 1, further including less than about 300 parts by weight of a filler per 100 parts of said neutralized sulfonated elastomeric polymer.

15. A composition according to claim 12, further including less than about 300 parts by weight of a filler per 100 parts of said neutralized sulfonated elastomeric polymer.

16. A composition according to claim 1, wherein said neutralized sulfonated elastomeric polymer is formed from an EPDM terpolymer having a Mooney viscosity (212° F., M.L. 1+8) of about 10 to about 60.

17. An elastomeric formed article formed by an extrusion or injection molding process from a blend composition comprising:
   (a) a neutralized sulfonated elastomeric polymer having about 15 to about 50 meq. of metal sulfonate groups per 100 grams of said neutralized sulfonated elastomeric polymer, said metal sulfonate containing an ammonium or metal counterion; and
   (b) about 10 to about 200 parts by weight of a non-polar process oil per 100 parts of said neutralized sulfonated elastomeric polymer, said non-polar process oil having less than 0.75 wt.% polar type compounds as measured by molecular type clay gel analysis and less than 10 wt.% aromatic constituents.

18. An elastomeric formed article according to claim 17, wherein said neutralized sulfonated elastomeric polymer is formed from an EPDM terpolymer having a Mooney viscosity (212° F., M.L. 1+8) of about 10 to about 60.

19. An elastomeric formed article according to claim 17 wherein said neutralized sulfonated elastomeric polymer is derived from an unsulfonated elastomeric polymer selected from the group consisting of Butyl rubber and EPDM terpolymers.

20. An elastomeric formed article according to claim 18, wherein said EPDM terpolymer consists essentially of about 45 to about 80 wt. percent of ethylene, from about 10 to about 53 wt. percent of an alpha-olefin, and about 2 to about 10 wt. percent of a diene monomer.

21. An elastomeric formed article according to claim 17, wherein said metal counterion is selected from the group consisting of iron, lead, antimony and Groups IA, IIA, IB or IIB of the Periodic Table of Elements and mixtures thereof.

22. An elastomeric formed article according to claim 17, wherein said blend composition further includes a preferential plasticizer at a concentration level of less than about 60 parts by weight per 100 parts of said neutralized sulfonated elastomeric polymer.

23. An elastomeric article according to claim 22, wherein said preferential plasticizer is selected from the group consisting of metallic salts of carboxylic acids, amides, ureas, thioureas and amines and mixtures thereof.

24. An elastomeric article according to claim 22, wherein said preferential plasticizer is a metallic salt of stearic acid, the metal ion of said metallic salt being selected from the group consisting of iron, lead, antimony and Groups IA, IIA, IB and IIB of the Periodic Table of Elements and mixtures thereof.

25. An elastomeric article according to claim 17 wherein said blend composition further includes less than about 300 parts by weight of a filler per 100 parts of said neutralized sulfonated elastomeric polymer.

26. An elastomeric article according to claim 22 wherein said blend composition further includes less than about 300 parts by weight of a filler per 100 parts of said neutralized sulfonated elastomeric polymer.

* * * * *